United States Patent [19]

Yoshie et al.

[11] 3,830,539

[45] Aug. 20, 1974

[54] IMPACT ENERGY ABSORBING BUMPER FOR VEHICLE

[75] Inventors: Koichi Yoshie; Kunihiko Masaki; Masaji Sakamoto, all of Toyota, Japan

[73] Assignee: Toyota Jidosha Kogyo Kabushiki Kaisha, Aichi-Ken, Japan

[22] Filed: Feb. 20, 1973

[21] Appl. No.: 333,657

[30] Foreign Application Priority Data

Mar. 21, 1972 Japan.............................. 47-28385

[52] U.S. Cl.................................. 293/75, 293/63
[51] Int. Cl.......................................... B60r 19/06
[58] Field of Search............ 293/62, 63, 75, 76, 77, 293/78, 60, 70, 85, 86

[56] References Cited
UNITED STATES PATENTS
1,755,393   4/1930   Hancock.............................. 293/78

1,793,680   2/1931   Cooke.................................. 293/62

FOREIGN PATENTS OR APPLICATIONS
19,940   10/1901   Great Britain....................... 293/86
505,851   5/1939   Great Britain....................... 293/86

Primary Examiner—M. Henson Wood, Jr.
Assistant Examiner—Robert Saifer
Attorney, Agent, or Firm—Stevens, Davis, Miller & Mosher

[57] ABSTRACT

An absorbing damper constructed of a plurality of absorbing members, a movable bumper and fixed bumpers, wherein the movable bumper retreats and absorbs collision energy of a vehicle. The movable bumper is so arranged that it can advance and retreat within a space defined by the floor plate of the body of the car.

1 Claim, 4 Drawing Figures

FIG. 1
FIG. 2
FIG. 3
FIG. 4
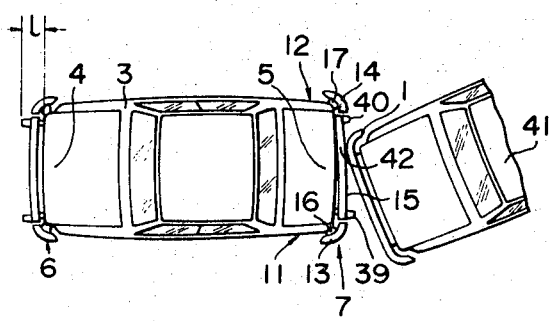
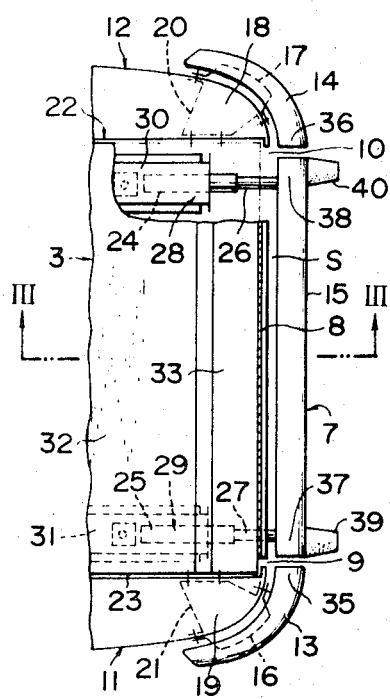

3,830,539

IMPACT ENERGY ABSORBING BUMPER FOR VEHICLE

FIELD OF THE INVENTION

This invention relates to an absorbing bumper for vehicles, and more particularly to a movable type absorbing damper which absorbs striking energy by moving a bumper portion in the lengthwise direction of a car body.

DESCRIPTION OF THE PRIOR ART

The bumper of a car should have the capability of sufficiently protecting a body outside plate and a variety of components on the car from low speed shock, and have strength so that the bumper can effect the shock absorbing and buffer actions over and over again, that is, it should endure repeated use. With a prior art fixed type bumper as shown at reference numeral 1 in FIG. 1, however, an impact force acting on the bumper is directly transmitted to the car body. It is therefore possible that components on the car will be damaged. A further disadvantage is that the bumper itself is deformed. In order to prevent such damage and deformation, it has been proposed to support the whole bumper by an impact energy absorber and to bring the bumper into the movable system. With the proposal, however, unless the car body structure is largely altered, the bumper need be disposed as illustrated in FIG. 1 in a manner that it protrudes outwardly from the car body at a length $l$ exceeding a stroke required for the energy absorption. The prior art structure is not only attended with the structural disadvantage that the bumper is supported by long supporting rods, but also it leads to a conspicuously poor appearance in design. Moreover, both side ends of the protruding bumper can bring about a danged to pedestrians.

SUMMARY OF THE INVENTION

It is an object of the present invention to provide an absorbing damper which can satisfactorily protect a body outside plate and other components against low speed impact and which can be used repeatedly.

Another object is to provide a damper which is not attended with large modifications in the structure and the external appearance of a car body and which allows partial manufacture and repair.

Still another object is to provide a movable type bumper.

With construction as defined in the appended claims, the present invention has accomplished a bumper which is free from the disadvantages of the prior art bumpers as stated above, and which effects satisfactory actions of absorbing and relieving striking energy, and has strength allowing it to be used again and again.

While the invention will be described hereunder in connection with an embodiment illustrated in the accompanying drawings, it is not restricted thereto in the features and advantages of the invention.

BRIEF DESCRIPTION OF THE DRAWINGS

FIG. 1 is a plan view showing the performance of the present invention during the collision of two cars;

FIG. 2 is a schematic plan view showing the floor surface of the rear part of a car body as exposed;

FIG. 3 is a sectional view taken along a line III—III in FIG. 2; and

FIG. 4 is a schematic plan view showing a different collision of the two cars.

DESCRIPTION OF THE PREFERRED EMBODIMENT

Although, in the illustrated embodiment, the present invention is applied to bumpers 6 and 7 at both the front part 4 and rear portion 5 of the car body 3 of an ordinary passenger car, it may be applied to one bumper only. The construction of the present invention will now be explained with respect to the bumper 7 of the rear portion 5 of an ordinary passenger car.

As shown in FIGS. 1 and 2, the bumper 7 is composed of right and left end bumper portions 13 and 14 which are respectively arranged in a manner to extend from both the side parts 9 and 10 of an extreme end face 8 of the rear portion 5 of the car body 3 toward car body sides 11 and 12 close to the extreme end face, and a main bumper portion 15 arranged between the end bumper portions 13 and 14.

The end bumper portions 13 and 14 are secured to the rear end parts of fenders 18 and 19 by means of reinforcing members 16 and 17. Further, the secured parts between the reinforcing members 16, 17 and the fenders 18, 19 are secured to floor side panels 22 and 23 by means of reinforcing members 20 and 21.

The main bumper portion 15 is attached to floor members 30 and 31 of the car body 3 by means of shock energy absorbers 28 and 29 such as hydraulic buffers which include cylinders 24 and 25 and pistons 26 and 27, respectively. In the case of this embodiment, the principal bumper portion 15 is adapted to retreat in the frontward direction of the car body 3 as shown by two-dot chain lines in FIG. 3, within a range determined by the strokes of the pistons 26 and 27 and at the action of a pressure larger than a set value. Upon disappearance of the pressure, the main bumper portion 15 can return to the original position.

As illustrated in FIG. 3, the frontward and rearward motions of the main bumper portion 15 are conducted under a trunk room floor 32 of the car body 3. For this reason, that part of the car body 3 which corresponds to the attached position of the main bumper portion 15 as shown in FIG. 2, namely, the rear end part of the trunk room floor 32 is bent upwards in the form of a stepped portion 33. A space 34 for movement in which the principal bumper portion 15 can freely move frontwards and rearwards, is thus formed beneath the stepped portion 33.

The main bumper portion 15 is arranged at the normal position so that, as shown in FIG. 2, it may be in parallel with the inner side ends 35 and 36 of the respective end bumper portions 13 and 14. In the embodiment, bumper guards 39 and 40 made of, for example, hard rubber are secured at both the ends 37 and 38 of the principal bumper portion 15 so as to project rearwardly, respectively. The rearwardly projecting length (L) of the bumper guards 39 and 40 is made longer than the stroke of the striking energy absorbers 28 and 29, that is, the stroke of the pistons 26 and 27.

Rubber blocks are sometimes disposed on the outside surfaces of the end bumper portions 13 and 14, or between these bumper portions 13, 14 and the reinforcing members 16, 17.

The present invention is constructed as has thus far been described. Therefore, in case where, as shown in FIG. 1, a car 41 collides against the main bumper portion 15 which is subjected to a shock being directed along the length of the car body 3 or having a certain extent of angle thereto, impact energy acting on the principal bumper portion 15 is absorbed by the impact energy absorbers 28 and 29, and the main bumper portion 15 moves towards the front of the car body in conformity with the direction of the impact force as is illustrated at reference numeral 42. When the car 41 separates from the principal bumper portion 15, the latter reverts to the previous position due to the stability of the shock energy absorbers 28 and 29.

In the case where the bumper suffers a collision in a conspicuously oblique direction, the end bumper portion 13 or 14 is directly subjected to the impact force. The energy is absorbed by elastic deformations of the reinforcing members 16 or 17 and 20 or 21.

In the case where the bumper guards 39 and 40 are provided as in the embodiment, the end bumper portion 13 or 14 is less subject to the action of the direct impact force even if a car 43 collides obliquely as shown in FIG. 4. More specifically, the bumper guard 40 is first subjected to the action of the impact force, transmits the energy to the main bumper portion 15 and the shock energy absorbers 28 and 29, and causes them to absorb and relieve the energy.

Without the separate provision of the bumper guards 39 and 40, the main bumper portion 15 may be projected to the position of the extreme end parts of the guards 39 and 40. It may also be partially projected to the position corresponding to the bumper guards 39 and 40.

While the foregoing description has been made of the bumper 7 of the rear portion 5 of the car body 3, the bumper 6 of the front portion 4 is quite similarly operated except that the moving direction of the main bumper portion is the opposite.

As described above in detail, in accordance with the present invention, the end bumper portions are mounted on the car body through the reinforcing members, and the main bumper portion is mounted thereon through the shock energy absorbers. An impact force acting on the bemper is therefore transmitted to the car body under the state under which the energy is absorbed and relieved, so that satisfactory protection of the body outside plate and other components can be attained. The main bumper portion most liable to the action of the impact force is attached to the striking energy absorbers, so that insofar as stability is retained in the absorbers, the main bumper portion is immediately restored to the previous position upon removal of the cause of the shock, thus becoming capable of repeated use.

From the viewpoint of both the working and the mounting structure, the end bumper portions, in which the frontward and rearward motions of the bumper have been difficult, are separated from the main bumper portion, and are secured through the reinforcing members to the car body. The main bumper portion can therefore have a sufficient stroke required for the absorption and relief of striking energy, even if the clearance (S) between the main bumper portion and the extreme end face 8 of the car body is made short as in the prior-art bumper. Accordingly, the aforesaid advantages can be attained without any substantial change in the structure and external appearance of the car.

Further, owing to the division between the end bumper portions and the main bumper portion, the former which is attended with difficulties in molding and the latter for which a high strength is required can be manufactured by making the material employed, construction, surface treatment etc. different so as to be optimal for the respective portions. This brings forth the advantage that the car bumper can be designed under conditions being the most suitable therefor in cost as well as in performance.

The divided construction of the bumper makes it possible, when any part is deformed or damaged by a collision or the like, for only the bumper part to be replaced or repaired. The mending can therefore be made easy and inexpensive.

In point of the structure, a comparatively simple one is provided, as well as one with sufficient strength to endure repeated use.

What we claim is:

1. An impact energy absorbing bumper for the body of a vehicle comprising:
    a plurality of absorbing members including a cylinder and a piston for absorbing impact energy during collision of the vehicle;
    a movable bumper which is movable in the forward and backward directions of the vehicle and attached to a portion of said pistons which projects outside at least one end of the body of the vehicle, said movable bumper and the vehicle body defining between them a space in which said movable bumper can move;
    a pair of fixed bumpers which extend from positions adjacent to both ends of said movable bumper toward the respective sides of the body and which are secured to strengthening members of the body; and
    bumper guards secured to the outside surface of said movable bumper and extending a predetermined distance therefrom, said absorbing members being housed in the framework of a floor member of the body, and the space in which said movable member moves being formed by bending an outside plate of the body into a step form above the floor member.

* * * * *